(12) United States Patent
Kyogoku et al.

(10) Patent No.: US 10,673,259 B2
(45) Date of Patent: Jun. 2, 2020

(54) IC CARD, AND IC CARD CHARGING CONNECTOR

(71) Applicant: J.S.T. Mfg. Co., Ltd., Osaka-shi (JP)

(72) Inventors: Yukihiro Kyogoku, Osaka (JP); Yoshifumi Nishida, Osaka (JP)

(73) Assignee: J.S.T. MFG. CO., LTD., Osaka-shi (JP)

( * ) Notice: Subject to any disclaimer, the term of this patent is extended or adjusted under 35 U.S.C. 154(b) by 42 days.

(21) Appl. No.: 16/027,608

(22) Filed: Jul. 5, 2018

(65) Prior Publication Data

US 2019/0020208 A1 Jan. 17, 2019

(30) Foreign Application Priority Data

Jul. 13, 2017 (JP) ................. 2017-136787

(51) Int. Cl.
*H02J 7/00* (2006.01)
*H01R 12/70* (2011.01)
*G06K 19/07* (2006.01)
*H01R 12/72* (2011.01)
*G06K 19/077* (2006.01)
*G06K 7/00* (2006.01)

(52) U.S. Cl.
CPC ........ *H02J 7/0044* (2013.01); *G06K 19/0704* (2013.01); *H01R 12/7005* (2013.01); *G06K 7/0013* (2013.01); *G06K 19/0723* (2013.01); *G06K 19/07707* (2013.01); *G06K 19/07709* (2013.01); *G06K 19/07743* (2013.01); *H01R 12/721* (2013.01)

(58) Field of Classification Search
CPC ..................................................... H02J 7/0044
USPC ......................................................... 320/114
See application file for complete search history.

(56) References Cited

U.S. PATENT DOCUMENTS

2011/0018490 A1* 1/2011 Furuya ............... G06K 19/0701
320/101
2018/0019501 A1* 1/2018 Ito ..................... H01M 10/0585

FOREIGN PATENT DOCUMENTS

JP 05342424 A * 12/1993 ........... G06K 19/077
JP 2008-41372 A 2/2008

* cited by examiner

*Primary Examiner* — Edward Tso
*Assistant Examiner* — Ahmed H Omar
(74) *Attorney, Agent, or Firm* — Kratz, Quintos & Hanson, LLP

(57) ABSTRACT

An IC card has an IC chip, a rechargeable battery that supplies electrical power to the IC chip, a card main body that houses the IC chip and the rechargeable battery, and charging terminals for charging the rechargeable battery. The charging terminals include a positive terminal arranged on one of the front surface and the rear surface of the card main body, and a negative terminal arranged on the other one.

7 Claims, 10 Drawing Sheets

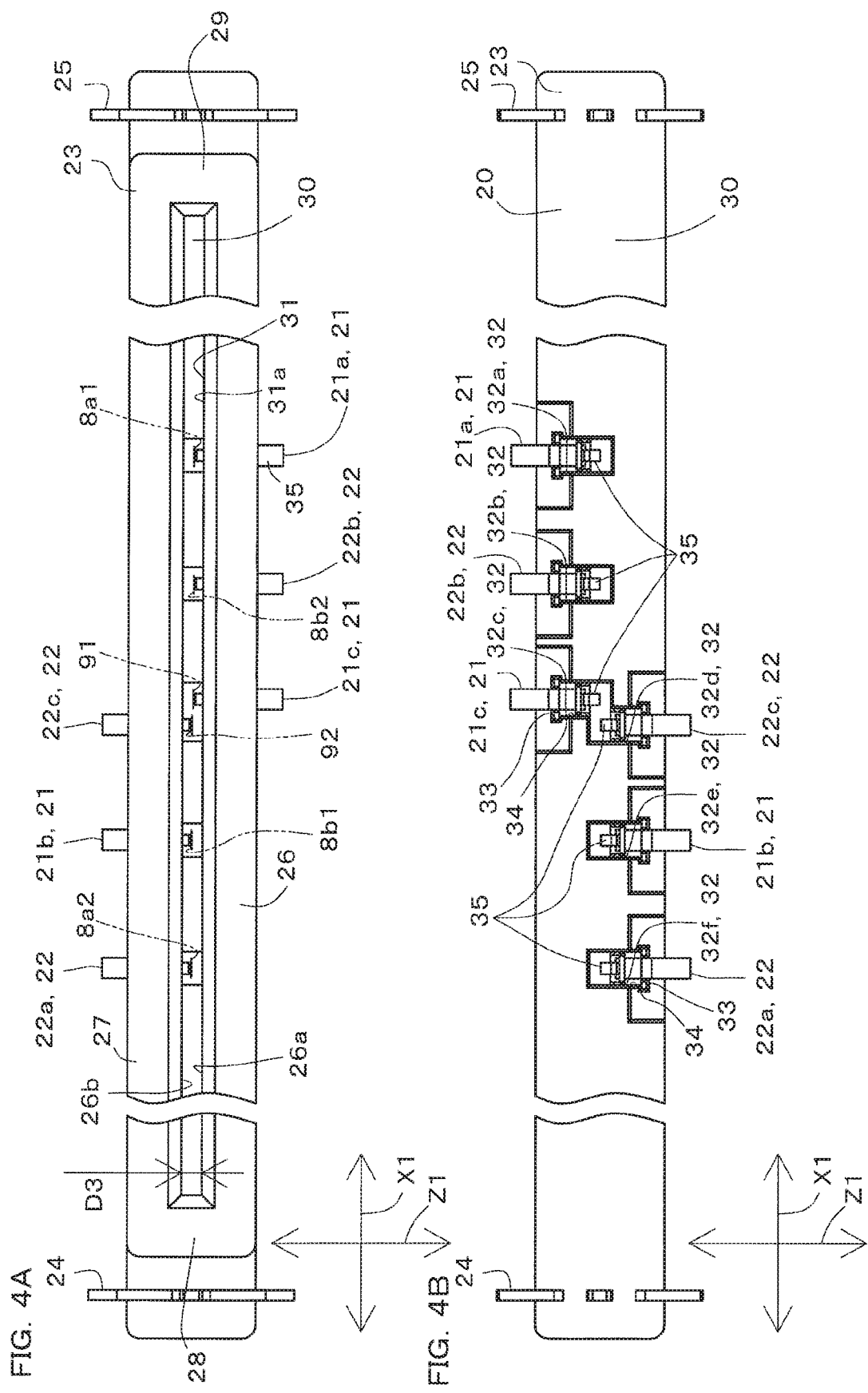

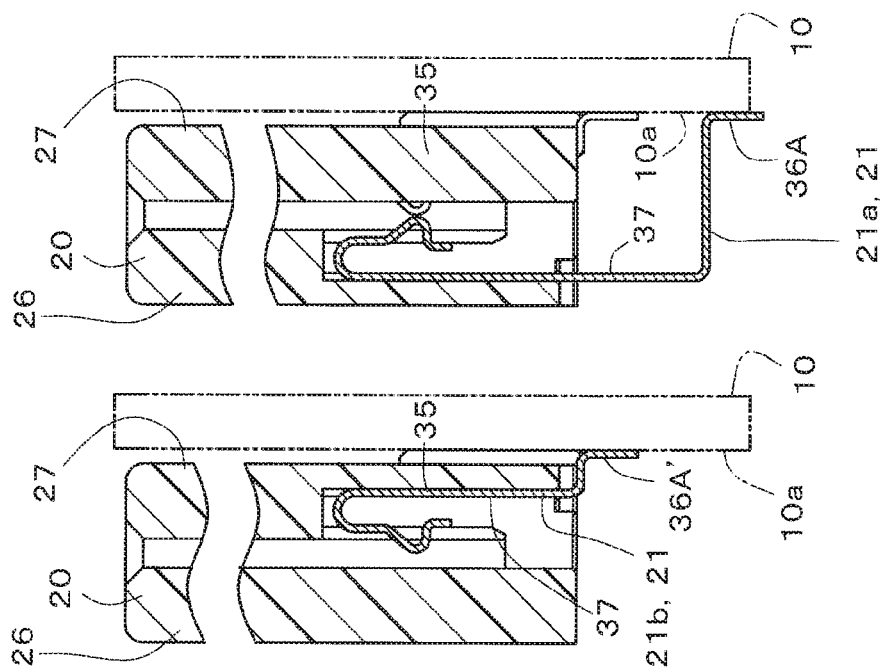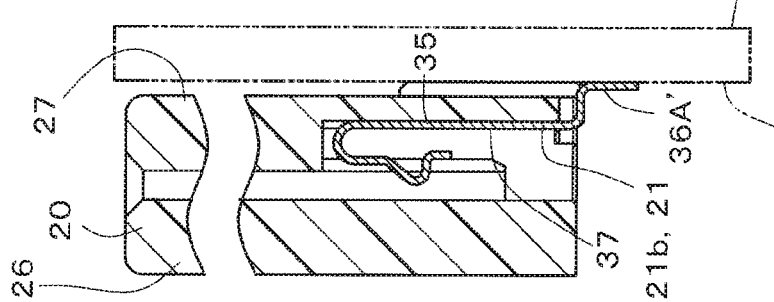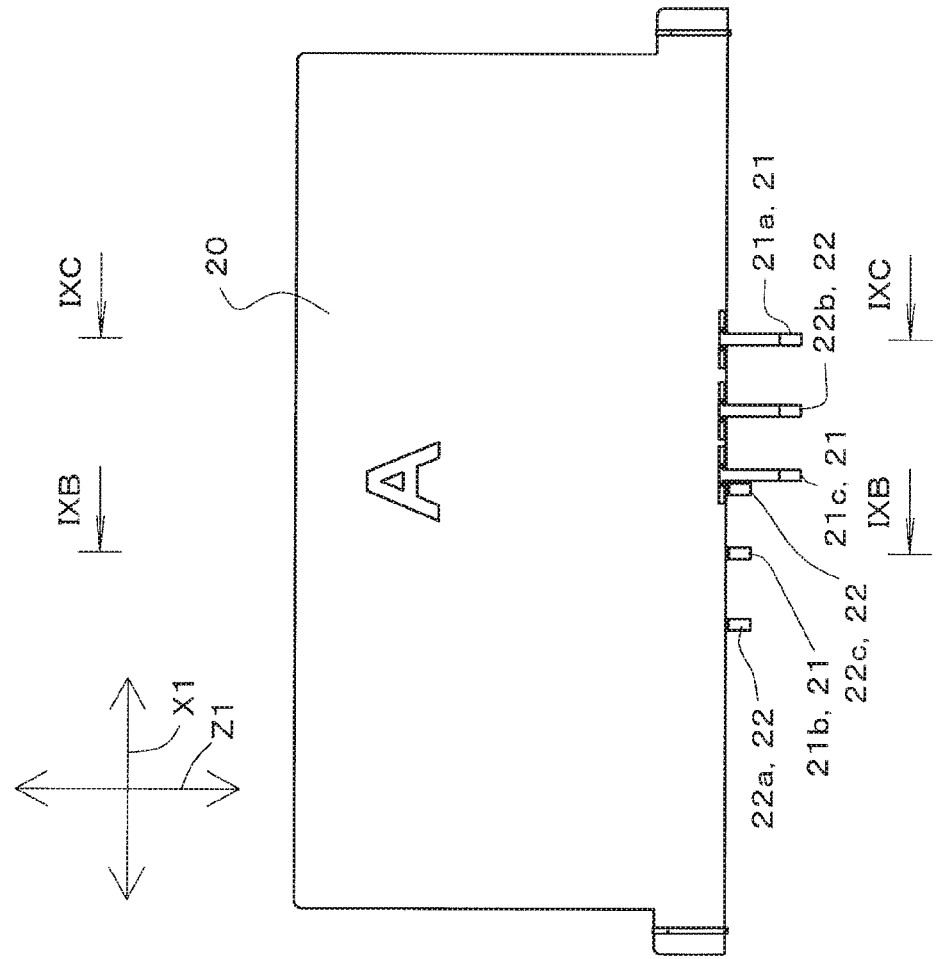

IC CARD, AND IC CARD CHARGING CONNECTOR

CROSS-REFERENCE TO RELATED APPLICATION

This application claims priority to Japanese Patent Application No. 2017-136787. The entire disclosure of Japanese Patent Application No. 2017-136787 is hereby incorporated herein by reference.

BACKGROUND OF THE INVENTION

1. Field of the Invention

The present invention relates to an IC card and an IC card charging connector.

2. Description of Related Art

IC cards have a configuration in which, for example, an IC chip is built into a rectangular plastic card, and the IC chip records data (e.g., see JP 2008-41372A). IC cards can record nearly 100 times more data than a magnetic card can, and are advantageous in terms of data encryption and resistance to falsification, and therefore have been applied to electronic money cards, identification cards, and the like.

IC cards are classified into contactless and contact types depending on differences in the method of reading and writing data. Contactless-type IC cards wirelessly exchange data using weak radio waves, and are used in automatic ticket gate systems and the like. Contact-type IC cards communicate with a card reader via a connector that comes into contact with metal foil terminals on the surface of the IC card. Contact-type IC cards are used as credit cards, for example.

A smart card is also known as a card into which an IC chip is built. Smart cards have a battery built in, and can exhibit functions on their own, without depending on a card reader. Example of such functions include causing an image to be displayed on a display device such as an electronic paper device included in the smart card, and performing data communication by radio wave transmission and reception.

SUMMARY OF THE INVENTION

It is preferable to be able to charge the battery built into the above-described smart card. As a configuration for charging the battery, it is conceivable to provide the smart card with charging terminals (electrodes). However, smart cards are compact, and if charging terminals are simply provided, there is a risk that the terminals will short-circuit.

In light of the aforementioned circumstances, an object of the present invention is to provide an IC card that can more reliably suppress short-circuiting that is attributed to the charging configuration, and an IC card charging connector that has a configuration suited to charging a rechargeable battery of the IC card.

(1) In order to achieve the above object, an IC card according to an aspect of the present invention includes: an IC chip; a rechargeable battery configured to supply power to the IC chip; a card main body configured to house the IC chip and the rechargeable battery; and charging terminals configured to charge the rechargeable battery, the charging terminals including a positive terminal arranged on one of a front surface and a rear surface of the card main body, and a negative terminal arranged on another one of the front surface and the rear surface.

According to this configuration, in the IC card, the surface provided with the positive terminal and the surface provided with the negative terminal face opposite directions. Accordingly, it is possible to set a longer creepage distance of insulation between the positive terminal and the negative terminal, thus making it possible to more reliably suppress short-circuiting of the positive terminal and the negative terminal.

(2) A configuration is possible in which a front/rear detection terminal configured to detect the front surface and the rear surface of the IC card is provided in one of the front surface and the rear surface of the card main body.

According to this configuration, when the IC card is to be charged by an IC card charging connector, the IC card charging connector can detect the orientation of the charging terminals relative to the IC card charging connector.

(3) In order to achieve the above object, an IC card charging connector according to an aspect of the present invention is an IC card charging connector for charging a rechargeable battery included in an IC card, the IC card charging connector including: a housing; and a charging contact unit that includes a positive electrode contact and a negative electrode contact that are held in the housing, wherein the positive electrode contact and the negative electrode contact are arranged so as to be capable of coming into contact with a positive terminal and a negative terminal that are formed in the IC card and are configured for charging the rechargeable battery.

According to this configuration, the charging contact unit is provided as a contact solely for charging the rechargeable battery included in the IC card.

Accordingly, it is possible to realize an IC card charging connector that has a configuration suited to charging the rechargeable battery of the IC card.

(4) A configuration is possible in which the housing includes a slot into which the IC card is to be inserted, and a first charging contact unit configured to come into contact with the positive terminal and the negative terminal when the IC card is inserted into the slot in a front-facing orientation, and a second charging contact unit configured to come into contact with the positive terminal and the negative terminal when the IC card is inserted into the slot in a rear-facing orientation, are provided as the charging contact unit.

According to this configuration, the IC card charging connector can charge the IC card regardless of whether the orientation of the IC card relative to the slot of the housing is the front-facing or the rear-facing orientation. Accordingly, the user of the IC card can insert the IC card into the IC card charging connector and charge the rechargeable battery without being concerned with the front/rear-facing orientation of the IC card relative to the slot.

(5) A configuration is possible in which the first charging contact unit and the second charging contact unit are arranged in point symmetry when viewed along an insertion direction of insertion of the IC card into the slot.

According to this configuration, it is possible to realize, with a simple configuration, an arrangement of the first and second charging contact units that enables charging the rechargeable battery regardless of the front/rear-facing orientation of the IC card relative to the slot.

(6) A configuration is possible in which the IC card charging connector further includes an orientation detection portion configured to detect a front/rear-facing orientation of the IC card.

According to this configuration, it is possible to determine, based on the detection result of the orientation detection portion, whether charging current is to be applied to the first charging contact unit or the second charging contact unit. Accordingly, it is possible to prevent needless power consumption at whichever of the contact units does not need power supply.

(7) A configuration is possible in which the orientation detection portion is aligned in a predetermined alignment direction with the positive electrode contact and the negative electrode contact of one charging contact unit, and with respect to the alignment direction, a distance from the orientation detection portion to the positive electrode contact is different from a distance from the orientation detection portion to the negative electrode contact.

According to this configuration, it is possible to ensure a sufficient distance between the positive electrode contact and the negative electrode contact. Accordingly, it is possible to ensure a sufficient distance between the positive terminal and the negative terminal of the IC card arranged at positions corresponding to the positions of these contacts. As a result, it is possible to more reliably suppress short-circuiting of the charging terminals of the IC card.

Note that the above and other objects, features, and advantages of this invention will become apparent by reading the following description with the attached drawings.

BRIEF DESCRIPTION OF THE DRAWINGS

FIG. 4A is a plan view of the IC card charging connector.
FIG. 4B is a bottom view of the IC card charging connector.
FIG. 9A is a diagram showing a variation of the connector.
FIG. 9B is a cross-sectional view taken along line IXB-IXB in FIG. 9A.
FIG. 9C is a cross-sectional view taken along line IXC-IXC in FIG. 9A.

DETAILED DESCRIPTION OF THE INVENTION

Hereinafter, an embodiment of the present invention will be described with reference to the drawings.

Figure 1:
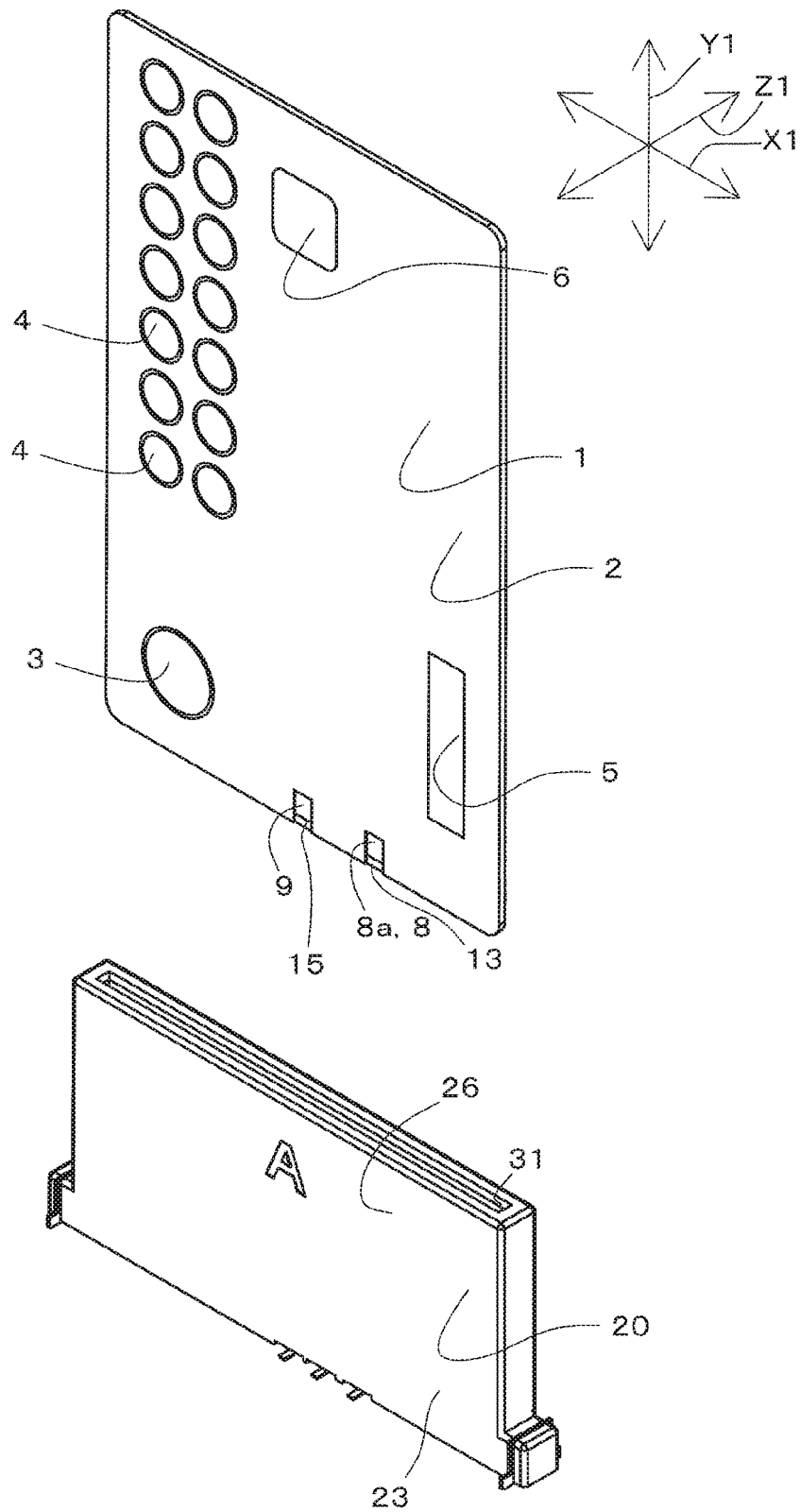
FIG. 1 is a perspective view of an IC card and an IC card charging connector according to an embodiment of the present invention.
Figure 2A:
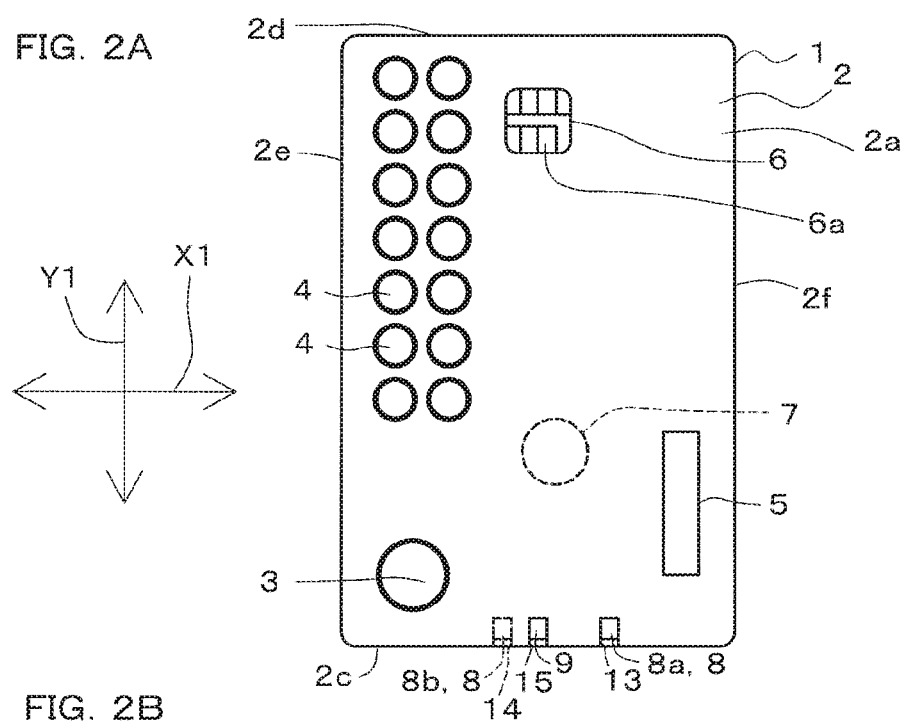
FIG. 2A is a view of a front surface of the IC card.
Figure 2B:
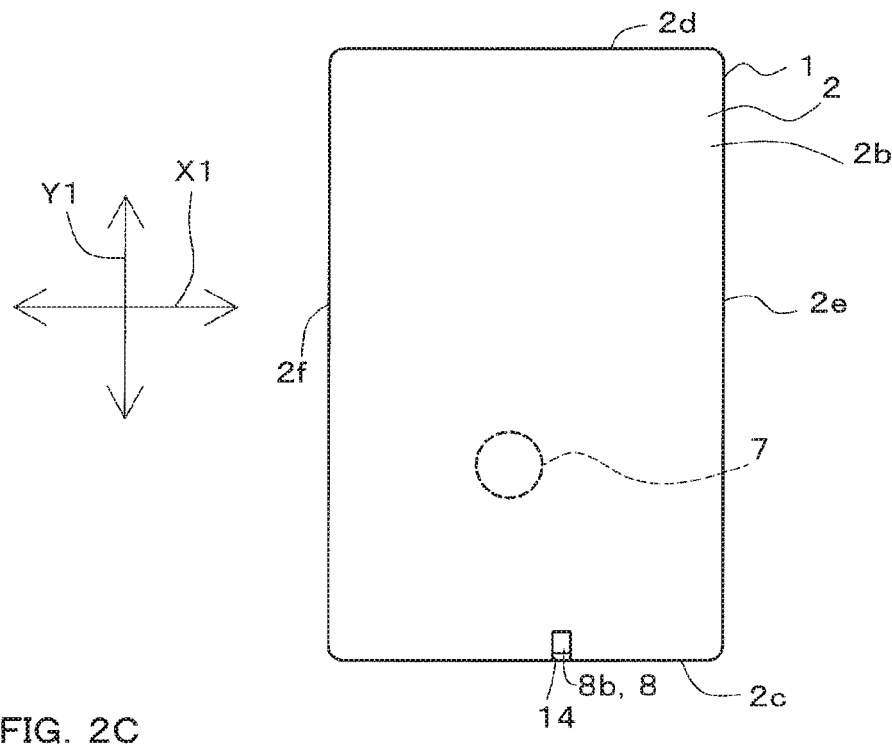
FIG. 2B is a view of a rear surface of the IC card.
Figure 2C:
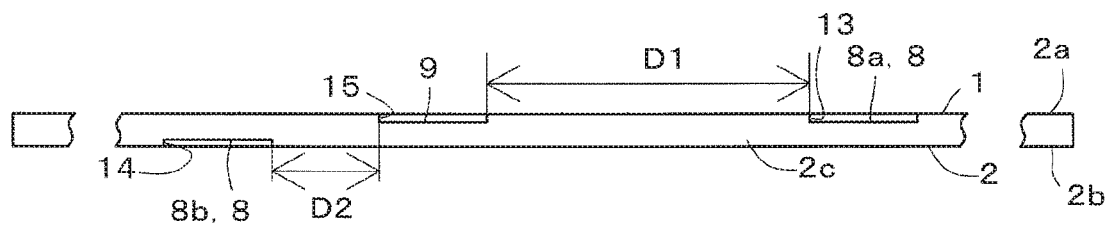
FIG. 2C is a view of a side surface of the IC card.

FIG. 1 is a perspective view of an IC card 1 and an IC card charging connector 20 according to an embodiment of the present invention. FIG. 2A is a view of a front surface of the IC card 1. FIG. 2B is a view of a rear surface of the IC card 1. FIG. 2C is a view of a side surface of the IC card 1.

As shown in FIGS. 1 to 2C, the IC card 1 is used as an electronic money card, a credit card, an authentication password generation card for internet banking, or the like. The IC card 1 of the present embodiment is a contact-type IC card, and is configured to perform data communication with an external device by coming into contact with terminals of a card reader/writer (not shown).

The IC card 1 includes a card main body 2 that is shaped as a rectangular flat plate, a power button 3, multiple input buttons 4, a display unit 5, an IC chip 6, a rechargeable battery 7, charging terminals 8, and a front/rear detection terminal 9.

The card main body 2 is a member formed using a synthetic resin or the like. The shape of the card main body 2 of the present embodiment is set the same as the shape of an ordinary credit card. The card main body 2 of the present embodiment has dimensions that comply with ISO/IEC 7810 for example, such as a vertical height of 85.60 mm, a horizontal width of 53.98 mm, and a thickness of 0.76 mm. Note that ISO/IEC is an abbreviation for International Organization for Standardization and the International Electrotechnical Commission. The power button 3, the input buttons 4, the display unit 5, and the IC chip 6 are arranged on a front surface 2a of the card main body 2. The portions of the outer surface of the card main body 2 other than the display unit 5, the charging terminals 8, and the front/rear detection terminal 9 are formed using a synthetic resin.

The power button 3 is provided for activating the IC chip 6 and the display unit 5. The power button 3 is arranged at a location that is in the vicinity of a short side 2c, which is one of a pair of short sides 2c and 2d of the IC card 1 and in the vicinity of a long side 2e, which is one of a pair of long sides 2e and 2f. The power supply of the IC card 1 is switched on and off by a pressing operation performed on the power button 3 by an operator.

The input buttons 4 are provided for operating the IC card 1. The input buttons 4 are arranged in the vicinity of the one long side 2e in the portion on the other short side 2d side, for example. Examples of the input buttons 4 include number buttons for the numbers 1 to 10, and predetermined operation buttons. When one of the input buttons 4 is pressed, a predetermined signal that corresponds to the pressed input button 4 is output to the IC chip 6.

The IC chip 6 has a CPU (Central Processing Unit), a ROM (Read Only Memory), a RAM (Random Access Memory), and the like, and exhibits desired functions by the CPU executing programs stored in a storage device such as the ROM. In the present embodiment, the IC chip 6 is housed in the card main body 2, and is electrically connected to the power button 3, the input buttons 4, the display unit 5, the rechargeable battery 7, the charging terminals 8, and the front/rear detection terminal 9 via conductive members (not shown). In the present embodiment, the IC card main body 2 has the front surface 2a and a rear surface 2b, and the IC chip 6 is exposed on the front surface 2a. The IC chip 6 is arranged adjacent to the input buttons 4 at a position toward the other short side 2d. Terminal portions 6a formed on the surface of the IC chip 6 are arranged on the front surface 2a side of the IC card main body 2. When the input buttons 4 are pressed in the power on state, the IC chip 6 can output, to the display unit 5, electrical signals that correspond to the pressed input buttons 4.

The display unit 5 is formed using a display device such as a liquid crystal display device or an electronic paper display device. The display unit 5 is arranged at a location that is toward the one short side 2c and toward the other long side 2f on the front surface 2a of the IC card main body 2, for example. The display unit 5 is configured to be capable of displaying multiple-digit numbers, for example, and performs display in accordance with signals from the IC chip 6.

The rechargeable battery 7 is housed in the IC card main body 2. The rechargeable battery is a battery that can be charged and discharge electricity, such as a lithium-ion battery, and is arranged inside the IC card main body 2. The rechargeable battery 7 is electrically connected to the IC chip 6 and the display unit 5 via conductive members (not shown), and supplies electrical power to the IC chip 6 and the display unit 5. Also, the rechargeable battery 7 is electrically connected to the charging terminals 8, and is charged by being supplied with electrical power via the charging terminals 8, the IC card charging connector 20, and a later-described substrate 10.

The charging terminals 8 are provided for charging the rechargeable battery 7. In the present embodiment, the charging terminals 8 are arranged in the vicinity of the one short side 2c of the card main body 2. The charging terminals 8 are formed on both the front surface 2a and the rear surface 2b of the card main body 2. The front/rear detection terminal 9 is also provided along with the charging terminals 8. The front/rear detection terminal 9 is provided in order for the substrate 10 to detect the front surface 2a and the rear surface 2b of the IC card 1, and is provided on either the front surface 2a or the rear surface 2b of the card main body 2.

The charging terminals 8 include a positive terminal 8a that is arranged on either one of the front surface 2a and the rear surface 2b of the card main body 2, and a negative terminal 8b that is arranged on the other one of the front surface 2a and the rear surface 2b. In the present embodiment, the positive terminal 8a is arranged on the front surface 2a of the card main body 2, and the negative terminal 8b is arranged on the rear surface 2b. Also, in the present embodiment, the front/rear detection terminal 9 is arranged on the front surface 2a of the card main body 2. The charging terminals 8 and the front/rear detection terminal 9 are provided as terminals that are separate from the terminal portion 6a of the IC chip 6.

These terminals 8a, 8b, and 9 are arranged side-by-side along a width direction X1 of the IC card 1, which is the direction in which the one short side 2c extends, and are arranged with spaces therebetween in the width direction X1. In other words, the terminals 8a, 8b, and 9 are arranged so as not to be overlapped in a thickness direction Z1 of the IC card 1. In the present embodiment, the positive terminal 8a, the front/rear detection terminal 9, and the negative terminal 8b are arranged in this order along the width direction X1. The terminals 8a, 8b, and 9 are respectively exposed in recession portions 13, 14, and 15 formed in the corresponding one of the front surface 2a and the rear surface 2b of the IC card main body 2. The recession portions 13 and 15 are formed by forming a recession in a portion of the synthetic resin that forms the front surface 2a of the IC card main body 2. Also, the recession portion 14 is formed by forming a recession in a portion of the synthetic resin that forms the rear surface 2b of the IC card main body 2.

These recession portions 13, 14, and 15 are formed with a rectangular shape, and are open at the corresponding one of the front surface 2a and the rear surface 2b, and are also open at the one short side 2c. The recession portions 13, 14, and 15 are each formed with a rectangular shape. The terminals 8a, 8b, and 9 are respectively arranged in the recession portions 13, 14, and 15, at locations therein that are slightly separated from the one short side 2c toward the other short side 2d side.

The terminals 8a, 8b, and 9 are formed using conductive films that are formed with rectangular shapes that correspond to the shapes of the recession portions 13, 14, and 15, for example. The positive terminal 8a and the negative terminal 8b are electrically connected to a positive terminal and a negative terminal of the rechargeable battery 7. Also, the front/rear detection terminal 9 is electrically connected to the IC chip 6, for example.

In the present embodiment, the terminals 8a, 8b, and 9 are substantially square-shaped with sides that are around several mm. In the present embodiment, the terminals 8a, 8b, and 9 are arranged in the vicinity of the display unit 5, and are arranged at a distance from the IC chip 6. The terminals 8a and 8b are at a distance from the IC chip 6, thus making it possible to more reliably suppress short-circuiting between the IC chip 6 and the terminals 8a and 8b. In the present embodiment, the terminals 8a, 8b, and 9 are arranged separated from the IC chip 6 by a distance greater than or equal to ½ the length of the IC card 1 in a length direction Y1.

The front/rear detection terminal 9 is arranged between the positive terminal 8a and the negative terminal 8b with respect to the width direction X1. Accordingly, the positive terminal 8a and the negative terminal 8b are arranged separated by a sufficient distance in the width direction X1. Furthermore, the positive terminal 8a and the negative terminal 8b are arranged separately on the front surface 2a and the rear surface 2b of the IC card 1 respectively. The front/rear detection terminal 9 and the positive terminal 8a are both arranged on the front surface 2a of the IC card main body 2, and thus a distance D1 between these terminals 8a and 9 in the width direction X1 is set relatively long. On the other hand, the front/rear detection terminal 9 and the negative terminal 8b are arranged separately on the front surface 2a and the rear surface 2b of the IC card main body 2, and thus a distance D2 between these terminals 8b and 9 in the width direction X1 is set relatively short, such that distance D1>D2. In the present embodiment, the distance D2 is set substantially the same as the width of each of the terminals 8a, 8b, and 9.

Next, the configuration of the IC card charging connector 20 will be described.

Figure 3A:
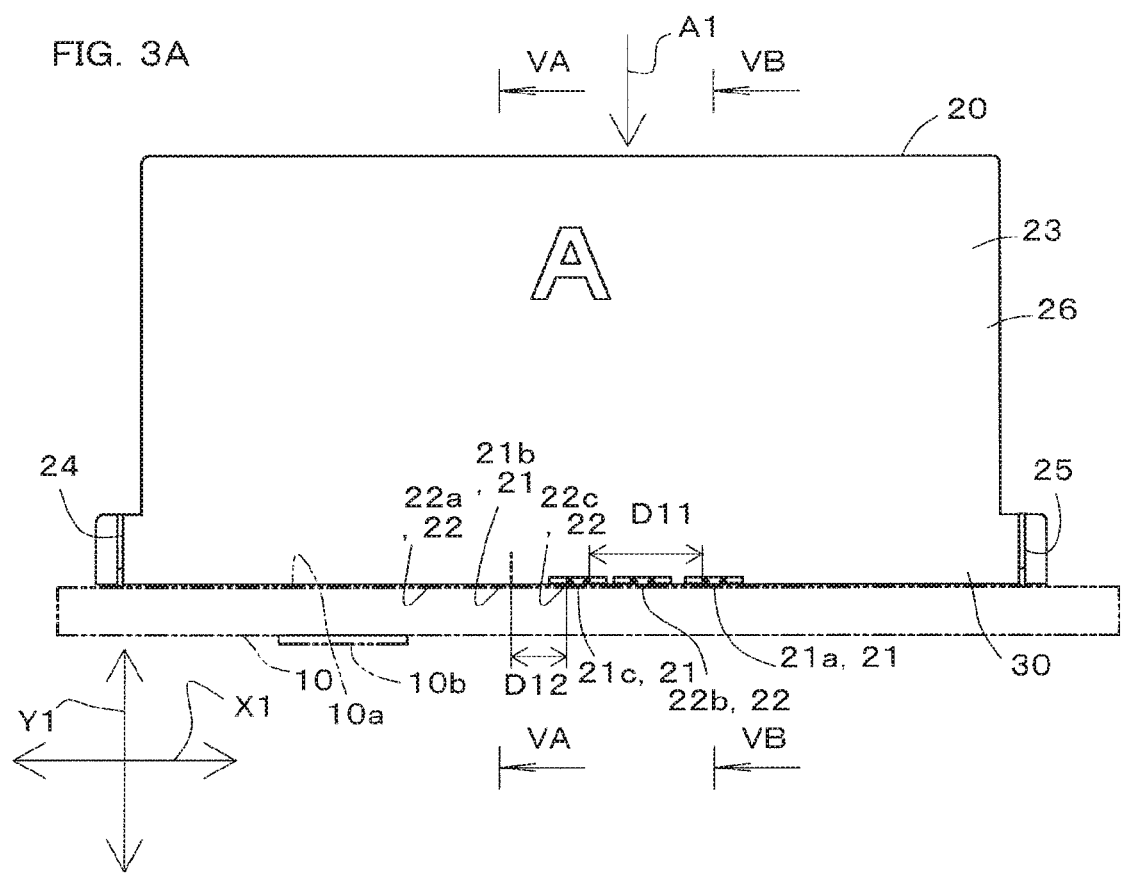
FIG. 3A is a front view of the IC card charging connector.
Figure 3B:
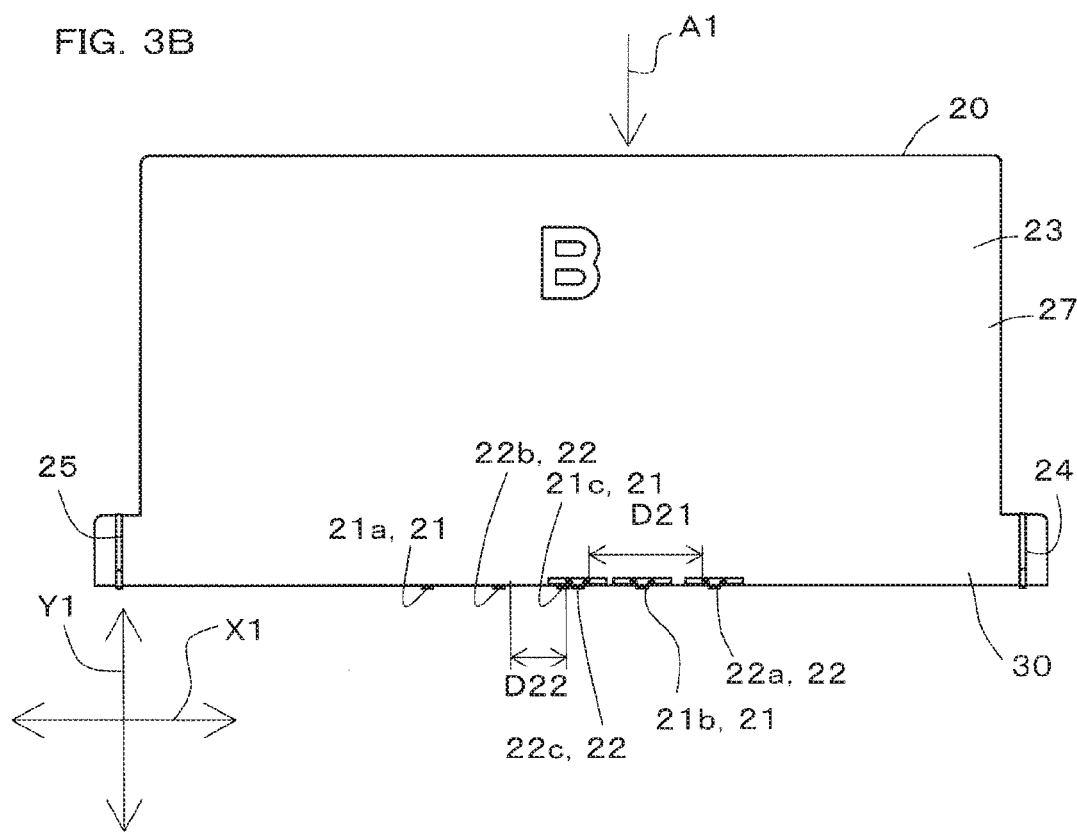
FIG. 3B is a view of a rear surface of the IC card charging connector.
Figure 5A:
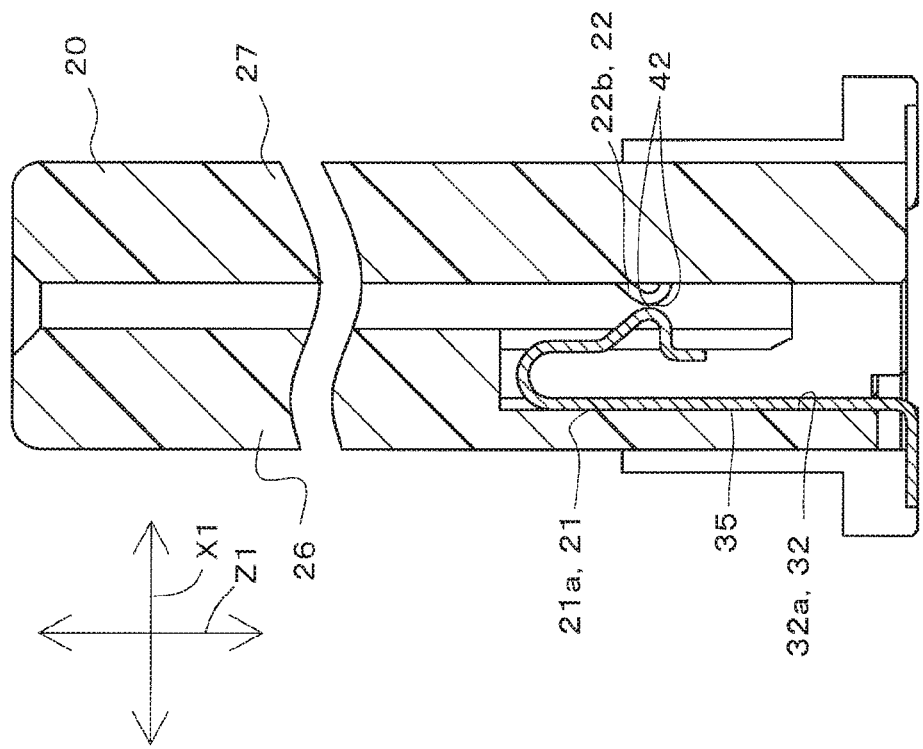
FIG. 5A is a cross-sectional view taken along line VA-VA in FIG. 3A.
Figure 5B:
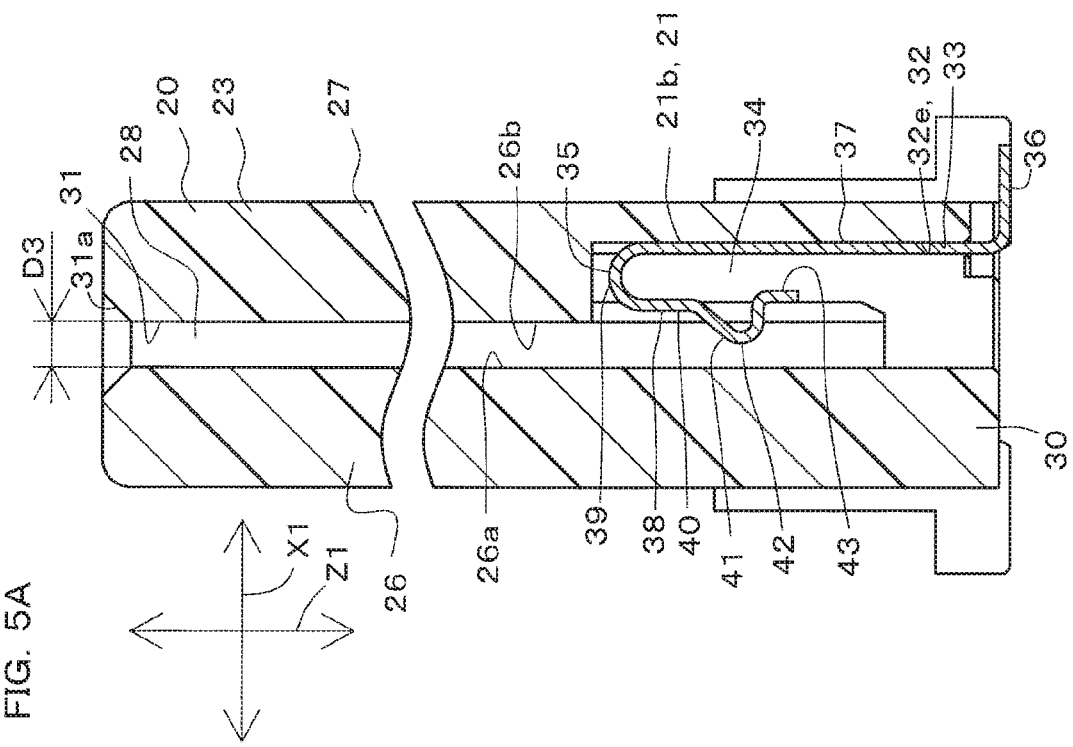
FIG. 5B is a cross-sectional view taken along line VB-VB in FIG. 3A.
Figure 6:
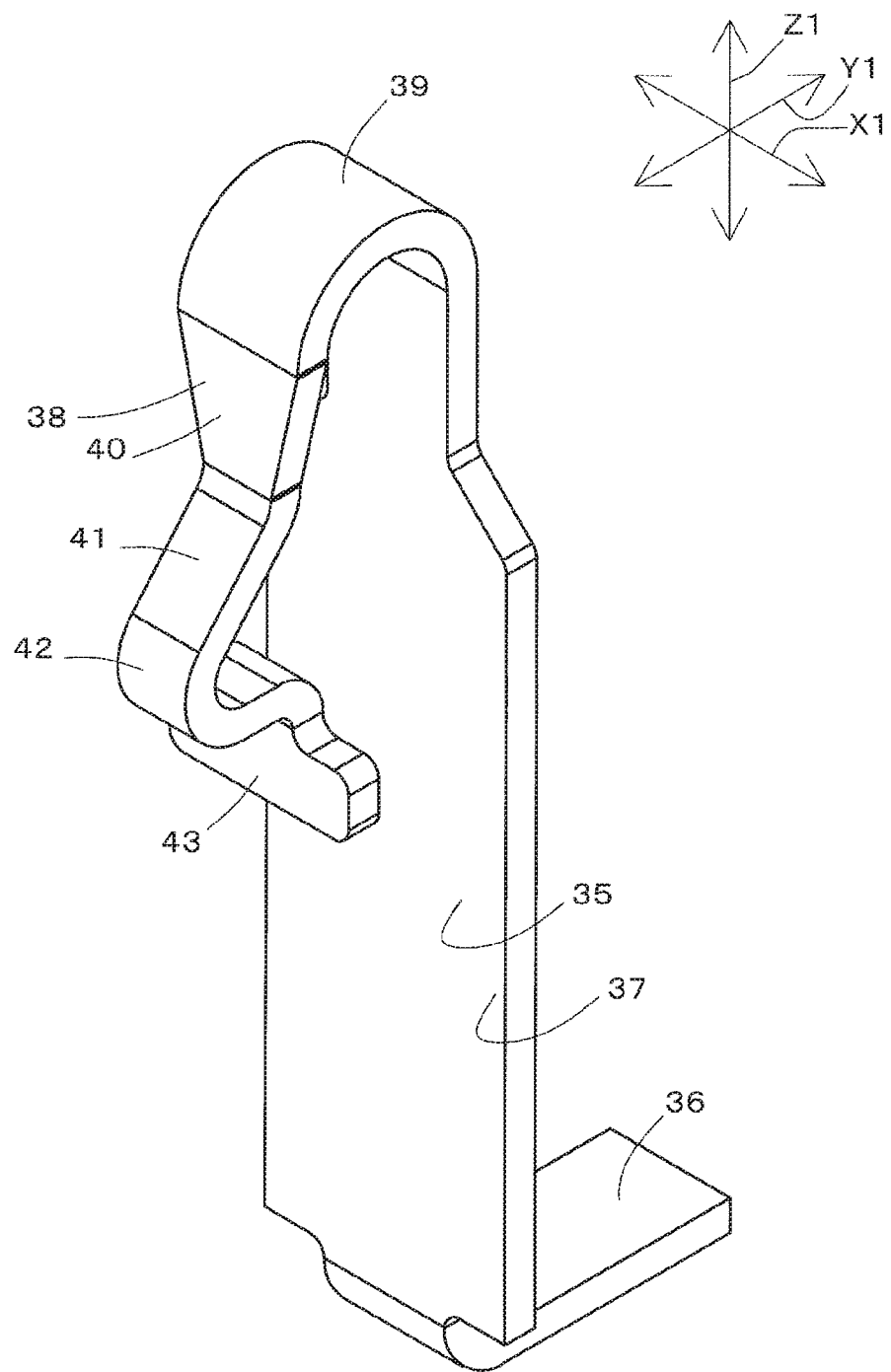
FIG. 6 is a perspective view of a contact formation member of the IC card charging connector.
Figure 7A:
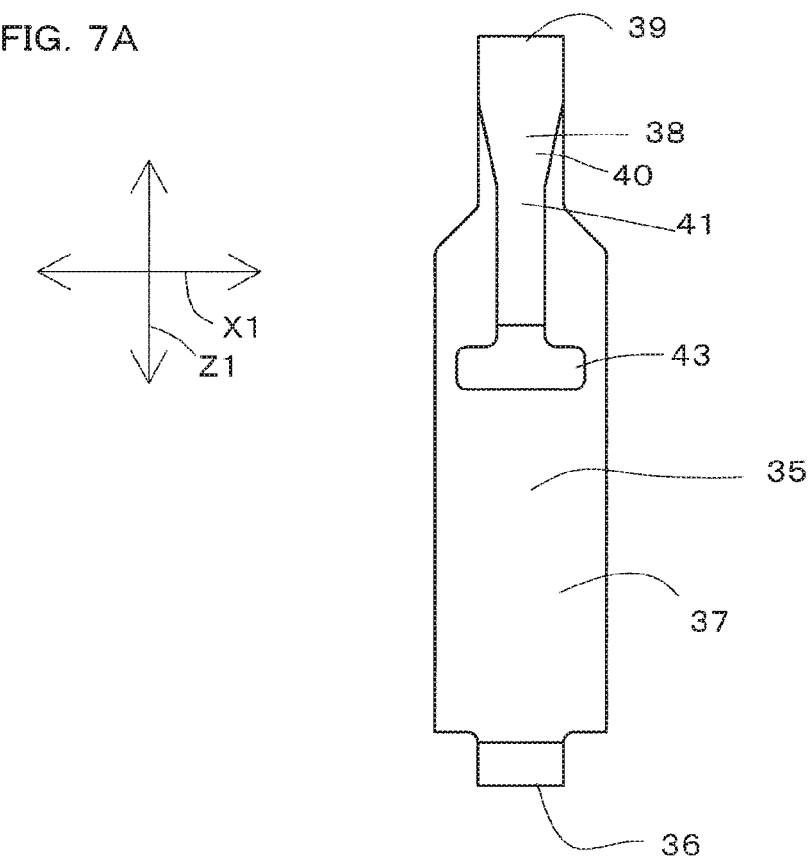
FIG. 7A is a front view of the contact formation member.
Figure 7B:
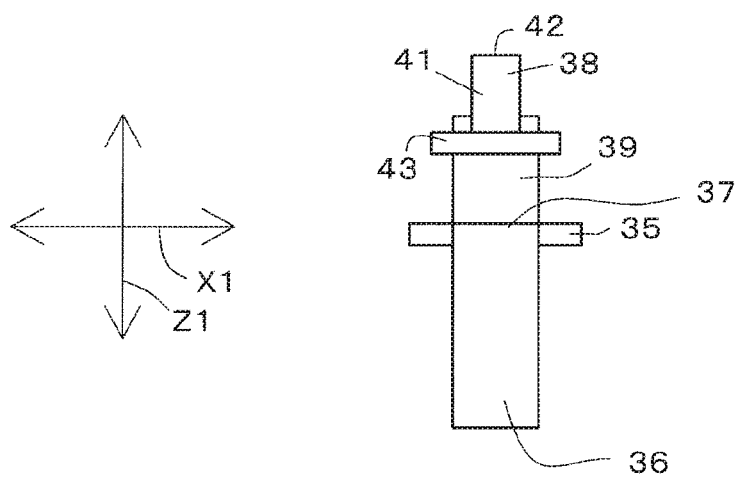
FIG. 7B is a bottom view of the contact formation member.
Figure 8C:
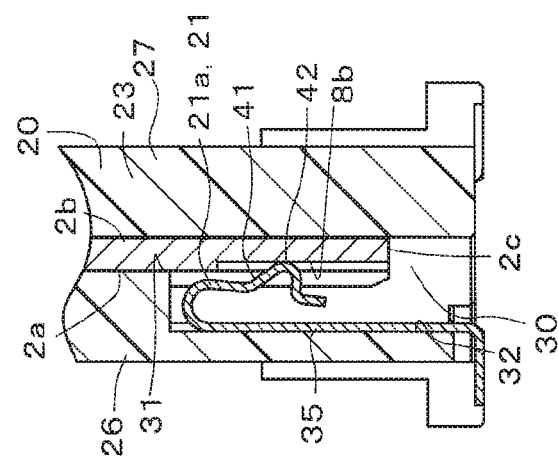
FIG. 8C is a cross-sectional view of the relevant portion taken along line VIIIC-VIIIC in FIG. 8A.
Figure 8B:
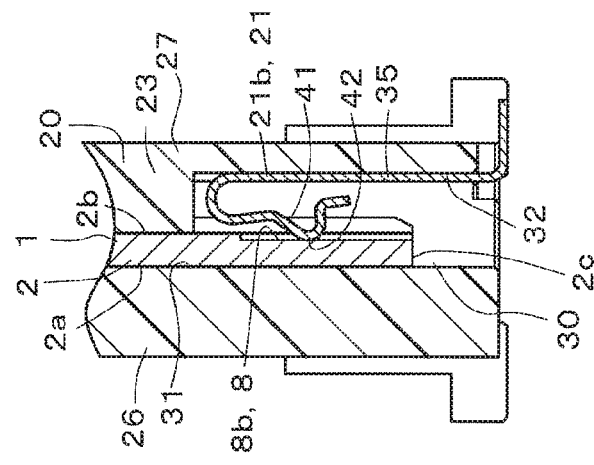
FIG. 8B is a cross-sectional view of a relevant portion taken along line VIIIB-VIIIB in FIG. 8A.
Figure 8A:
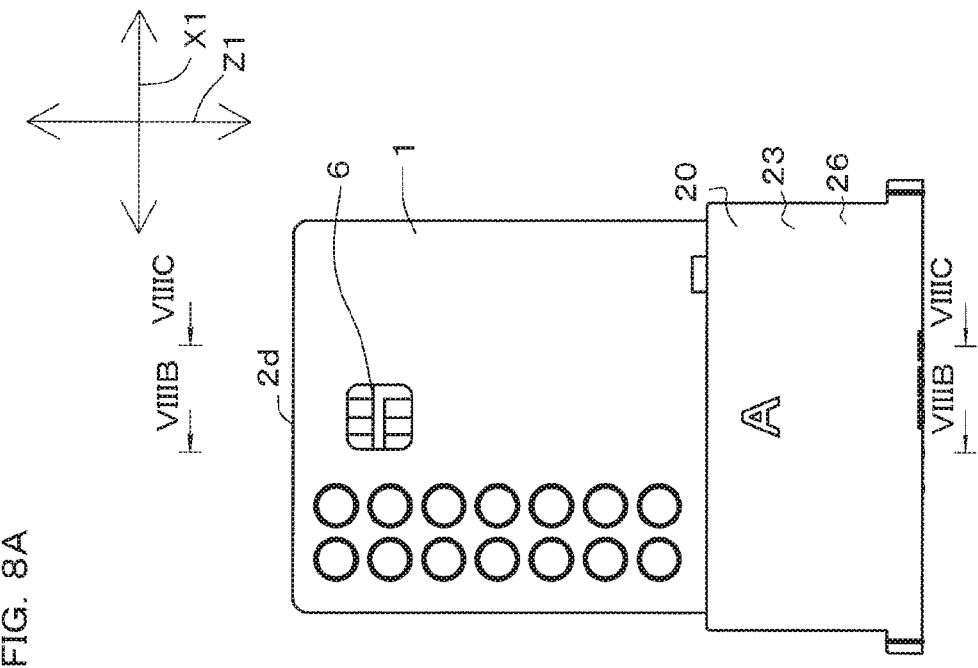
FIG. 8A is a front view showing a state where the IC card is inserted into the IC card charging connector in a front-facing orientation.

FIG. 3A is a front view of the IC card charging connector 20. FIG. 3B is a view of a rear surface of the IC card charging connector 20. FIG. 4A is a plan view of the IC card charging connector 20. FIG. 4B is a bottom view of the IC card charging connector 20. FIG. 5A is a cross-sectional view taken along line VA-VA in FIG. 3A. FIG. 5B is a cross-sectional view taken along line VB-VB in FIG. 3A. FIG. 6 is a perspective view of a contact formation member 35 of the IC card charging connector 20. FIG. 7A is a front view of the contact formation member 35. FIG. 7B is a bottom view of the contact formation member 35. FIG. 8A is a front view showing a state where the IC card 1 is inserted into the IC card charging connector 20 in a front-facing orientation. FIG. 8B is a cross-sectional view of a relevant portion taken along line VIIIB-VIIIB in FIG. 8A. FIG. 8C is a cross-sectional view of the relevant portion taken along line VIIIC-VIIIC in FIG. 8A.

As shown in FIGS. 2A and 3A to 5B, the IC card charging connector 20 (hereinafter, also simply called the connector 20) is provided for charging the rechargeable battery 7 built into the IC card 1. In the present embodiment, the rechargeable battery 7 can be charged by the connector 20 regardless of whether the IC card 1 is inserted into the connector 20 in the front-facing or the rear-facing orientation. The connector 20 is mounted on a substrate 10 (FIGS. 3A and 3B), for example. In the present embodiment, the connector 20 is attached to the substrate 10 by surface mounting technology (SMT). A charging control circuit 10b is provided on the substrate 10. The charging control circuit 10b supplies electrical power from a power supply (not shown) to the IC card 1 via the connector 20.

The connector 20 includes a first charging contact unit 21, a second charging contact unit 22, a housing 23, and reinforcement tabs 24 and 25.

The housing 23 is an insulating member formed using a synthetic resin, and holds the contact units 21 and 22. The housing 23 is approximately shaped as a flattened rectangle, for example. In the present embodiment, the housing 23 is installed in a vertical orientation on the substrate 10. A protrusion portion is formed on each of two end portions, with respect to the width direction X1 of the connector 20, of the base end portion of the housing 23, and the reinforcement tabs 24 and 25, which are formed by pressing metal plates, are fixed to these protrusion portions. Portions of the reinforcement tabs 24 and 25 project from the housing 23, and these projecting portions and the substrate 10 are fixed to each other by soldering or the like.

The housing 23 has an A wall 26 that is a front wall, a B wall 27 that is a rear wall parallel with the A wall 26, a first side wall 28 that connects first end portions of the A wall 26 and the B wall 27 in the width direction X1, a second side walls 29 that connects second end portions of the A wall 26 and the B wall 27 in the width direction X1, and a bottom wall 30 that connects base end portions of the A wall 26, the B wall 27, the first side wall 28, and the second side wall 29. Also, a slot 31, which serves as a portion for insertion of a portion of the IC card 1 on the one short side 2c side, is formed by the A wall 26, the B wall 27, the first side wall 28, the second side wall 29, and the bottom wall 30.

In the present embodiment, the A wall 26, the B wall 27, the first side wall 28, and the second side wall 29 extend in a vertical orientation so as to be orthogonal to the substrate 10. The A wall 26 and the B wall 27 are each shaped as a rectangular flat plate and extend in the width direction X1 and the length direction Y1, and the length thereof in the width direction X1 is longer than the length in the length direction Y1. Note that in the present embodiment, for both the IC card 1 and the connector 20, the width direction, the length direction, and the thickness direction are respectively called the width direction X1, the length direction Y1, and the thickness direction Z1.

The space between an inner surface 26a of the A wall 26 and an inner surface 27a of the B wall 27 corresponds to a thickness D3 of the slot 31, and is set slightly larger than the thickness of the IC card 1. Multiple housing hole portions 32 are formed in each of the A wall 26 and the B wall 27. The later-described contact formation members 35 of the contact units 21 and 22 are housed in the housing hole portions 32 (32a to 32f). In other words, one contact formation member 35 is housed in each of the housing hole portions 32a to 32f.

The housing hole portions 32a to 32f are formed at the locations where the corresponding contact formation members 35 are to be housed. The housing hole portions 32a to 32f are formed so as to penetrate the bottom wall 30, and extend toward the opening portion 31a side of the slot 31 over a predetermined length from the base end portion side of the corresponding one of the A wall 26 and the B wall 27. The lengths of the housing hole portions 32 in the length direction Y1 are slightly larger than the lengths of the contact formation members 35 in the length direction Y1. The housing hole portions 32a to 32f are open to the slot 31, and therefore the contact formation members 35 can come into contact with the IC card 1 inserted into the slot 31. As shown clearly in FIG. 4B, the housing hole portions 32a to 32f each have a wide portion 33 and a narrow portion 34.

The length of the wide portion 33 in the width direction X1 is set larger than that of the narrow portion 34. The wide portion 33 is arranged at a location on the deep side relative to the corresponding one of the inner surfaces 26a and 27a of the A wall 26 and the B wall 27, and extends along the length direction Y1. The narrow portion 34 is continuous with the corresponding one of the inner surfaces 26a and 27a of the A wall 26 and the B wall 27.

As shown in FIG. 4A, the first side wall 28 and the second side wall 29 each extend with an elongated shape in the length direction Y1. The previously-described protrusion portions 26 and 27 that connect the reinforcement tabs 24 and 25 are provided at the base end portion of the first side wall 28 and the base end portion of the second side wall 29.

As shown in FIGS. 8A to 8C, the slot 31 is a portion that receives and houses the IC card 1 when the IC card 1 is to be charged by the connector 20. In the present embodiment, the slot 31 is configured so as to house a portion that is less than half of the IC card 1 in the length direction Y1 of the IC card 1. The thickness of the space formed by the slot 31 is set slightly (approximately several tenths of 1 mm) larger than the thickness of the IC card 1. In the present embodiment, when the IC card 1 is inserted into the slot 31, the IC chip 6 is located outside the slot 31. Note that the slot 31 may be configured so as to house a majority portion of the IC card 1 including the charging terminals 8 and the IC chip 6. When the IC card 1 is inserted into the slot 31, the charging terminals 8 alternatively come into contact with the first charging contact unit 21 or the second charging contact unit 22.

As shown in FIGS. 2A, 4A to 5B, and 8A to 8C, the first charging contact unit 21 is provided in order to come into contact with the positive terminal 8a, the negative terminal 8b, and the front/rear detection terminal 9 of the IC card 1 when the IC card 1 is inserted into the slot 31 in the front-facing orientation. Also, the second charging contact unit 22 is provided in order to come into contact with the positive terminal 8a, the negative terminal 8b, and the front/rear detection terminal 9 of the IC card 1 when the IC card 1 is inserted into the slot 31.

Note that the front-facing state of the IC card 1 refers to a state in which the IC card 1 is inserted into the slot 31 with the front surface 2a of the IC card 1 facing the A wall 26 side rather than the B wall 27 side, which is the state shown in FIGS. 8A to 8C. On the other hand, the rear-facing state of the IC card 1 refers to a state in which the IC card 1 is inserted into the slot 31 with the front surface 2a of the IC card 1 facing the B wall 27 side rather than the A wall 26 side, and this state is not shown in the figures. The members of the first charging contact unit 21 are attached to the A wall 26 and the B wall 27. Similarly, the members of the second charging contact unit 22 are attached to the A wall 26 and the B wall 27.

The first charging contact unit 21 includes a first positive electrode contact 21*a*, a first negative electrode contact 21*b*, and a first orientation detection portion 21*c* for detecting the front/rear-facing orientation of the IC card 1.

The second charging contact unit 22 includes a second positive electrode contact 22*a*, a second negative electrode contact 22*b*, and a second orientation detection portion 22*c* for detecting the front/rear-facing orientation of the IC card 1.

The first positive electrode contact 21*a*, the first negative electrode contact 21*b*, and the first orientation detection portion 21*c* are held in the housing 23, and are configured so as to respectively come into contact with the positive terminal 8*a*, the negative terminal 8*b*, and the front/rear detection terminal 9 when the IC card 1 is inserted into the slot 31 in the front-facing orientation. In FIG. 4A, reference signs 8*a*1, 8*b*1, and 91 indicate the terminals 8*a*, 8*b*, and 9 when the IC card 1 is inserted in the front-facing orientation. The first positive electrode contact 21*a*, the first negative electrode contact 21*b*, and the first orientation detection portion 21*c* are arranged in a portion that is toward the one end side (toward the reinforcement tab 25) relative to the center of the housing 23 in the width direction X1.

In the present embodiment, the first positive electrode contact 21*a* and the first orientation detection portion 21*c* are respectively attached to the housing hole portions 32*a* and 32*c* of the A wall 26, and the first negative electrode contact 21*b* is attached to the housing hole portion 32*e* of the B wall 27. According to this configuration, the first orientation detection portion 21*c* is aligned with the first positive electrode contact 21*a* and the first negative electrode contact 21*b* in the width direction X1. Also, as shown in FIG. 3A, with respect to the width direction X1, a distance D11 from the first orientation detection portion 21*c* to the first positive electrode contact 21*a* is different from a distance D12 from the first orientation detection portion 21*c* to the first negative electrode contact 21*b*. In the present embodiment, distance D11>D12.

Also, the first positive electrode contact 21*a*, the first negative electrode contact 21*b*, and the first orientation detection portion 21*c* are fixed to predetermined terminals (not shown) provided in the substrate 10 using solder or the like, and are electrically connected to the charging control circuit 10*b* via the corresponding terminals. Accordingly, when the first orientation detection portion 21*c* and the front/rear detection terminal 9 of the IC card 1 come into contact, the charging control circuit 10*b* determines that the IC card 1 was inserted into the slot 31 in the front-facing orientation, and applies current to the first positive electrode contact 21*a* and the first negative electrode contact 21*b*. At this time, the charging control circuit 10*b* does not apply current to the second positive electrode contact 22*a* and the second negative electrode contact 22*b*.

Again, as shown in FIGS. 2A, 4A to 5B, and 8A to 8C, the second positive electrode contact 22*a*, the second negative electrode contact 22*b*, and the second orientation detection portion 22*c* are housed in the housing 23, and are configured so as to respectively come into contact with the positive terminal 8*a*, the negative terminal 8*b*, and the front/rear detection terminal 9 when the IC card 1 is inserted into the slot 31 in the rear-facing orientation. In FIG. 4A, reference signs 8*a*2, 8*b*2, and 92 indicate the terminals 8*a*, 8*b*, and 9 when the IC card 1 is inserted in the rear-facing orientation.

The second positive electrode contact 22*a*, the second negative electrode contact 22*b*, and the second orientation detection portion 22*c* are arranged in a portion that is toward the other end side (toward the reinforcement tab 24) relative to the center of the housing 23 in the width direction X1.

In the present embodiment, the second negative electrode contact 22*b* is attached to the housing hole portion 32*b* of the A wall 26, and the second orientation detection portion 22*c* and the second positive electrode contact 22*a* are respectively attached to the housing hole portions 32*d* and 32*f* of the B wall 27. According to this configuration, the second orientation detection portion 22*c* is aligned with the second positive electrode contact 22*a* and the second negative electrode contact 22*b* in the width direction X1. Also, as shown in FIGS. 3A and 4B, with respect to the width direction X1, a distance D21 from the second orientation detection portion 22*c* to the second positive electrode contact 22*a* is different from a distance D22 from the second orientation detection portion 22*c* to the second negative electrode contact 22*b*. In the present embodiment, distance D21>D22.

Also, the second positive electrode contact 22*a*, the second negative electrode contact 22*b*, and the second orientation detection portion 22*c* are fixed to predetermined terminals (not shown) provided in the substrate 10 using solder or the like, and are electrically connected to the charging control circuit 10*b* via the corresponding terminals. Accordingly, when the second orientation detection portion 22*c* and the front/rear detection terminal 9 of the IC card 1 come into contact, the charging control circuit 10*b* determines that the IC card 1 was inserted into the slot 31 in the rear-facing orientation, and applies current to the second positive electrode contact 22*a* and the second negative electrode contact 22*b*. At this time, the charging control circuit 10*b* does not apply current to the first positive electrode contact 21*a* and the first negative electrode contact 21*b*.

As shown in FIGS. 4A and 4B, according to the above configuration, the first positive electrode contact 21*a*, the second negative electrode contact 22*b*, and the first orientation detection portion 21*c* are arranged in this order along the width direction X1 in the A wall 26. Also, the second orientation detection portion 22*c*, the first negative electrode contact 21*b*, and the second positive electrode contact 22*a* are arranged in this order along the width direction X1 in the B wall 27. Also, the positions of the first orientation detection portion 21*c* and the second orientation detection portion 22*c* are slightly misaligned in the width direction X1.

According to this configuration, the first charging contact unit 21 and the second charging contact unit 22 are arranged in point symmetry when viewed along an insertion direction A1 of insertion of the IC card 1 into the slot 31, as shown in FIG. 4A. In other words, the arrangement of the first charging contact unit 21 matches the arrangement of the second charging contact unit 22 if rotated 180 degrees about a predetermined axis that is parallel with the insertion direction A1.

The first positive electrode contact 21*a*, the first negative electrode contact 21*b*, the first orientation detection portion 21*c*, the second positive electrode contact 22*a*, the second negative electrode contact 22*b*, and the second orientation detection portion 22*c* are each formed by the contact formation member 35.

As shown in FIGS. 4B to 8C, the contact formation members 35 are each formed by performing press processing and bend processing on an electrically conductive metal plate having a plated surface. The contact formation members 35 are attached to the corresponding housing hole portions 32. In the present embodiment, the contact formation members 35 are substantially L-shaped in a side view.

The contact formation members 35 each have a fixing portion 36, a base portion 37, and a movable piece portion 38.

The fixing portion 36 is an elongated rectangular portion that extends parallel with a front surface 10a of the substrate 10, and is fixed to a corresponding terminal (not shown) of the substrate 10 by soldering or the like. One end portion of the fixing portion 36 is continuous with the base portion 37.

The base portion 37 is a flat plate-shaped portion that extends parallel with the A wall 26 and the B wall 27. The majority portion of the base portion 37 on the fixing portion 36 side extends in an elongated manner in the length direction Y1 with a wider width than the fixing portion 36, and is fixed by press-fitting or the like into the wide portion 33 of the corresponding housing hole portion 32. Also, the leading end side portion of the base portion 37 extends in the length direction Y1 with a narrower width than the wide portion 33. The movable piece portion 38 is continuous with the leading end of the base portion 37.

The movable piece portion 38 includes a U-shaped portion 39, which is formed with a U-shape, in the base end portion that is continuous with the base portion 37, and has a shape curving from the wide portion 33 toward the narrow portion 34 inside the corresponding housing hole portion 32. In the present embodiment, the width of the U-shaped portion 39 is the same as the width of the leading end portion of the base portion 37. An elongated portion 40, which decreases in length in the width direction X1 while extending away from the U-shaped portion 39, is provided at the leading end of the U-shaped portion 39. A mountain-shaped portion 41 is provided at the leading end of the elongated portion 40.

The mountain-shaped portion 41 has a curved shape protruding toward the slot 31, and in the present embodiment, is approximately V-shaped in a side view. The peak portion of the mountain-shaped portion 41 forms a contact portion 42 for coming into contact with the corresponding one of the positive terminal 8a, the negative terminal 8b, and the front/rear detection terminal 9 of the IC card 1. A stopper portion 43 is provided at the leading end portion of the mountain-shaped portion 41. The stopper portion 43 comes into contact with the base portion 37 when the mountain-shaped portion 41 has been pressed by the IC card 1 a predetermined amount in the direction away from the slot 31 (toward the base portion 37). This therefore restricts displacement and deformation of the movable piece portion 38, including the mountain-shaped portion 41. The stopper portion 43 is shaped as a rectangle elongated in the width direction X1, and is aligned approximately parallel with the base portion 37.

As described above, according to the present embodiment, in the IC card 1, the front surface 2a provided with the positive terminal 8a and the rear surface 2b provided with the negative terminal 8b face opposite directions. Accordingly, it is possible to set a longer creepage distance of insulation between the positive terminal 8a and the negative terminal 8b, thus making it possible to more reliably suppress short-circuiting of the positive terminal 8a and the negative terminal 8b.

Also, according to the present embodiment, the front/rear detection terminal 9 for detecting the front surface 2a and the rear surface 2b of the IC card 1 is provided on either one of the front surface 2a and the rear surface 2b of the card main body 2 (the front surface 2a in the present embodiment). According to this configuration, when the IC card 1 is to be charged by the connector 20, the connector 20 can detect the orientation of the charging terminals 8 relative to the connector 20.

Also, according to the present embodiment, the connector 20 is provided with the charging contact units 21 and 22 as contacts solely for charging the rechargeable battery 7 included in the IC card 1. Accordingly, it is possible to realize the connector 20 that has a configuration suited to charging the rechargeable battery 7 of the IC card 1.

Also, according to the present embodiment, the housing 23 includes the slot 31 for insertion of the IC card 1, and is provided with, as charging contact units, the first charging contact unit 21 for coming into contact with the positive terminal 8a and the negative terminal 8b when the IC card 1 is inserted into the slot 31 in the front-facing orientation, and the second charging contact unit 22 for coming into contact with the positive terminal 8a and the negative terminal 8b when the IC card 1 is inserted into the slot 31 in the rear-facing orientation. According to this configuration, the connector 20 can charge the IC card 1 regardless of whether the orientation of the IC card 1 relative to the slot 31 of the housing 23 is in the front-facing or rear-facing orientation. Accordingly, the user of the IC card 1 can insert the IC card 1 into the connector 20 and charge the rechargeable battery 7 without being concerned with the front/rear-facing orientation of the IC card 1 relative to the slot 31.

Also, according to the present embodiment, the first charging contact unit 21 and the second charging contact unit 22 are arranged in point symmetry when viewed along the insertion direction A1 of insertion of the IC card 1 into the slot 31. According to this configuration, it is possible to realize, with a simple configuration, an arrangement of the first and second charging contact units 21 and 22 that enables charging the rechargeable battery 7 regardless of the front/rear-facing orientation of the IC card 1 relative to the slot 31.

Also, according to the present embodiment, the connector 20 has the orientation detection portions 21c and 22c for detecting the front/rear-facing orientation of the IC card 1. According to this configuration, it is possible to determine, based on the detection results of the orientation detection portions 21c and 22c, whether charging current is to be applied to the first charging contact unit 21 or the second charging contact unit 22. Accordingly, it is possible to prevent needless power consumption at whichever of the contact units 21 and 22 does not need power supply.

Also, according to the present embodiment, the orientation detection portions 21c and 22c are respectively aligned with the positive contacts 21a and 22a and negative contacts 21b and 22b in the width direction X1. Also, with respect to the width direction X1, the distance D11 from the first orientation detection portion 21c to the first positive electrode contact 21a is different from the distance D12 from the first orientation detection portion 21c to the first negative electrode contact 21b. Also, with respect to the width direction X1, the distance D21 from the second orientation detection portion 22c to the second positive electrode contact 22a is different from the distance D22 from the second orientation detection portion 22c to the second negative electrode contact 22b. According to this configuration, it is possible to ensure a sufficient distance between the first positive electrode contact 21a and the first negative electrode contact 21b and ensure a sufficient distance between the first positive electrode contact 22a and the first negative electrode contact 22b. Accordingly, it is possible to ensure a sufficient distance between the positive terminal 8a and the negative terminal 8b of the IC card 1 arranged at positions corresponding to the positions of the contacts 21a, 21b, 22a, and 22b. As a result, it is possible to more reliably suppress short-circuiting of the terminals 8a and 8b.

Although an embodiment of the present invention is described above, the present invention is not limited to the above embodiment, and various modifications can be made without departing from the description of the claims. In other words, the present invention is not limited to the above embodiment, and all modifications, applications, and equivalents thereof that fall within the claims, for which modifications and applications would become naturally apparent by reading and understanding the present specification, are intended to be embraced in the claims of the invention. For example, modifications such as the following may be implemented. Note that the following mainly describes differences from the above embodiment, and similar configurations will be denoted by the same reference signs in the figures, and will not be described in detail.

(1) The above embodiment describes an example in which the connector 20 is arranged in a vertical orientation on the substrate 10. However, this is not required. For example, as shown in FIGS. 9A to 9C that illustrate a variation of the connector 20, the connector 20 may be arranged in a horizontal orientation on the substrate 10. In this case, the B wall 27 of the connector 20 is arranged so as to be adjacent to the front surface 10a of the substrate 10. Also, in each of the contact formation members 35 of the contacts 21a, 22b, and 21c on the A wall 26 side, a fixing portion 36A fixed to the substrate 10 is provided at one end of an elongated portion that extends from the base portion 37 in the shape of a large crank. Also, in each of the contact formation members 35 of the contacts 22c, 21b, and 22a on the B wall 27 side, a fixing portion 36A fixed to the substrate 10 is provided at one end of an elongated portion that extends from the base portion 37 in the shape of a small crank.

(2) Also, the above embodiment describes an example in which the connector 20 is a surface mounted type of connector. However, this is not required. For example, the connector 20 may be a dip type of connector in which the contacts 21a, 21b, 22a, and 22b are inserted into through-holes formed in the substrate 10.

(3) The above embodiment describes an example of a configuration in which the orientation of the IC card 1 is detected by the orientation detection portions 21c and 22c coming into contact with the front/rear detection terminal 9 of the IC card 1. However, this is not required. For example, a configuration is possible in which a depression portion is provided in the front surface 2a or the rear surface 2b of the IC card 1, and cam mechanisms capable of coming into contact with the depression portion are provided on the A wall 26 and the B wall 27 of the connector 20. Then, when the IC card 1 is inserted into the slot 31, the front-facing or rear-facing orientation of the IC card 1 may be detected based on the difference between the drive amount of the cam mechanism on the A wall 26 side and the drive amount of the cam mechanism on the B wall 27 side.

Figure 10A:
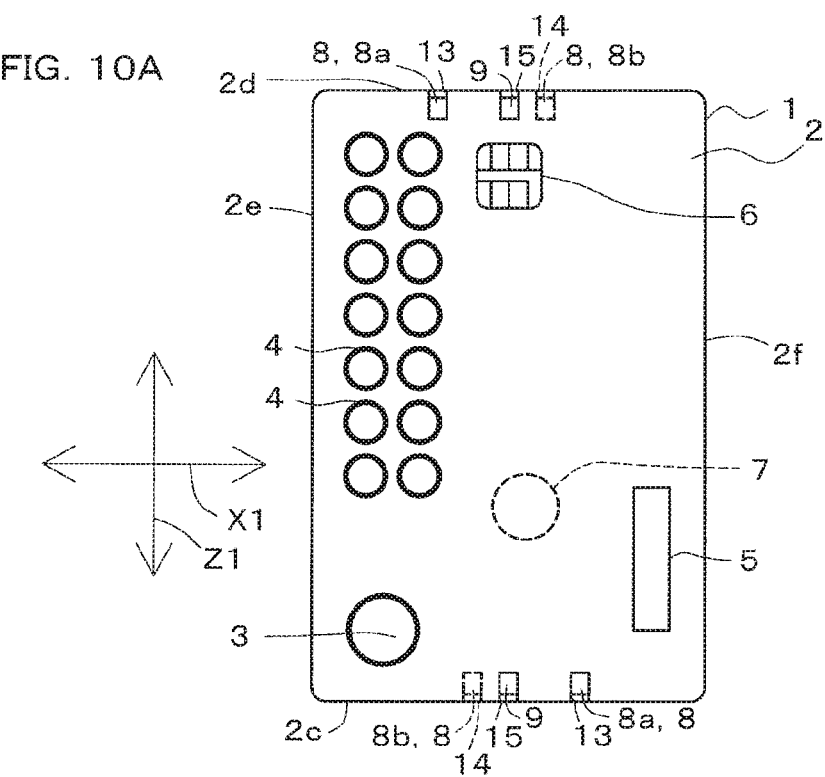
FIG. 10A is a diagram showing a variation of the IC card.

(4) Also, the above embodiment describes an example in which the charging terminals 8 and the front/rear detection terminal 9 are provided on the one short side 2c side of the IC card 1. However, this is not required. For example, as shown in FIG. 10A the charging terminals 8 and the front/rear detection terminal 9 may be provided on the other short side 2d side of the IC card 1 as well. The charging terminals 8 and the front/rear detection terminal 9 on the other short side 2d side are arranged in point symmetry relative to the charging terminals 8 and the front/rear detection terminal 9 on the one short side 2c side in a plan view of the IC card 1 (i.e., are arranged at locations rotated 180 degrees about the center of the IC card 1). According to this configuration, the IC card 1 can be charged regardless of the front/rear-facing orientation, both when the one short side 2c side is inserted into the slot 31, and when the other short side 2d side is inserted into the slot 31.

(5) Also, the above embodiment describes an example in which the charging terminals 8 and the front/rear detection terminal 9 are arranged toward a short side of the IC card 1 rather than a long side. However, this is not required. For example, the charging terminals 8 and the front/rear detection terminal 9 may be arranged toward a long side of the IC card 1 rather than a short side.

(6) Also, the above embodiment describes an example in which the two charging contact units 21 and 22 are provided. However, this is not required. For example, either one of the two charging contact units 21 and 22 may be omitted.

Figure 10B:
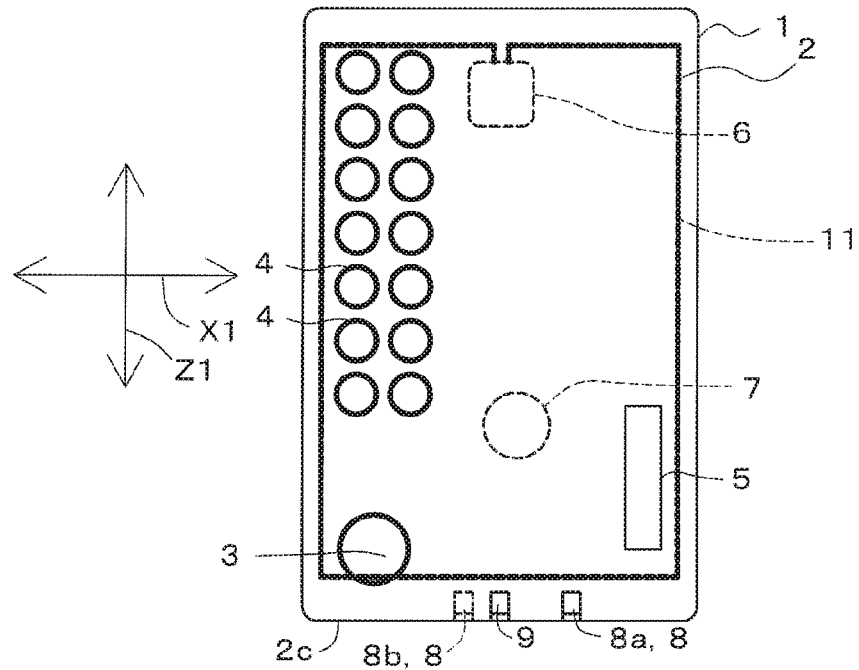
FIG. 10B is a diagram showing another variation of the IC card.

(7) Also, the above embodiment describes an example in which the IC card 1 is a contact-type card. However, this is not required. For example, a contactless-type IC card 1B shown in FIG. 10B may be used instead of the IC card 1. In the IC card 1B, the IC chip 6 and an antenna coil 11 for wireless communication with an outside device are embedded in the card main body 2, and the antenna coil 11 is electrically connected to the IC chip 6. Aspects of the configuration of the IC card 1B other than the above are similar to the configuration of the IC card 1.

INDUSTRIAL APPLICABILITY

The present invention is broadly applicable as an IC card and an IC card charging connector.

What is claimed is:

1. An IC card comprising:
an IC chip;
a rechargeable battery configured to supply power to the IC chip;
a card main body configured to house the IC chip and the rechargeable battery; and
charging terminals configured to charge the rechargeable battery, the charging terminals including a positive terminal arranged on one of a front surface and a rear surface of the card main body, and a negative terminal arranged on another one of the front surface and the rear surface,
wherein the front surface of the card main body includes a first recession open to the front surface and a side surface of the card main body, the first recession accommodating therein one of the positive terminal and the negative terminal, and
wherein the rear surface of the card main body includes a second recession open to the rear surface and the side surface of the card main body, the second recession accommodating therein the another one of the positive terminal and the negative terminal.

2. The IC card according to claim 1, wherein a front/rear detection terminal configured to detect the front surface and the rear surface of the IC card is provided in one of the front surface and the rear surface of the card main body.

3. An IC card charging connector for charging a rechargeable battery included in an IC card, the IC card charging connector comprising:
a housing; and
a charging contact unit that includes a positive electrode contact and a negative electrode contact that are held in the housing, wherein the positive electrode contact and the negative electrode contact are arranged so as to be capable of coming into contact with a positive terminal and a negative terminal that are formed in the IC card and are configured for charging the rechargeable battery, wherein a front surface of the IC card includes a first recession open to the front surface and a side surface of the IC card the first recession accommodating therein one of the positive terminal and the negative terminal, and wherein a rear surface of the IC card includes a second recession open to the rear surface and the side surface of the IC card, the second recession accommodating therein the another one of the positive terminal and the negative terminal.

4. The IC card charging connector according to claim 3, wherein the housing includes a slot into which the IC card is to be inserted, and a first charging contact unit configured to come into contact with the positive terminal and the negative terminal when the IC card is inserted into the slot in a front-facing orientation, and a second charging contact unit configured to come into contact with the positive terminal and the negative terminal when the IC card is inserted into the slot in a rear-facing orientation, are provided as the charging contact unit.

5. The IC card charging connector according to claim 4, wherein the first charging contact unit and the second charging contact unit are arranged in point symmetry when viewed along an insertion direction of insertion of the IC card into the slot.

6. The IC card charging connector according to claim 3, further comprising an orientation detection portion configured to detect a front/rear-facing orientation of the IC card.

7. The IC card charging connector according to claim 6,
wherein the orientation detection portion is aligned in a predetermined alignment direction with the positive electrode contact and the negative electrode contact of one charging contact unit, and with respect to the alignment direction, a distance from the orientation detection portion to the positive electrode contact is different from a distance from the orientation detection portion to the negative electrode contact.

* * * * *